United States Patent [19]

Osugi et al.

[11] Patent Number: 5,085,503
[45] Date of Patent: Feb. 4, 1992

[54] SPATIAL LIGHT MODULATING ELEMENT USING UNIAXIAL SINGLE CRYSTAL OF OXIDE AS INSULATING LAYER

[75] Inventors: Yukihisa Osugi; Hiroaki Abe; Yoshinari Kozuka, all of Nagoya, Japan

[73] Assignee: NGK Insulators, Ltd., Aichi, Japan

[21] Appl. No.: 584,612

[22] Filed: Sep. 19, 1990

[30] Foreign Application Priority Data

Sep. 19, 1989 [JP] Japan ................... 1-243207

[51] Int. Cl.$^5$ ................ G02F 1/03; G02B 5/30; G02B 1/19
[52] U.S. Cl. ................... 359/246; 359/250; 359/251; 359/276
[58] Field of Search ............ 350/384, 385, 388, 389, 350/392, 393, 355, 356

[56] References Cited

U.S. PATENT DOCUMENTS

| | | | |
|---|---|---|---|
| 3,446,966 | 5/1969 | Peterson | 350/388 |
| 3,572,898 | 3/1971 | Eaglesfield | 350/356 |
| 3,938,878 | 2/1976 | Fox | 350/389 |

FOREIGN PATENT DOCUMENTS

| | | | |
|---|---|---|---|
| 54-48262 | 4/1979 | Japan . | |
| 57-49916 | 3/1982 | Japan . | |
| 0010410 | 3/1987 | Japan | 350/356 |
| 63-110416 | 5/1988 | Japan . | |
| 1479909 | 5/1989 | U.S.S.R. | 350/356 |

OTHER PUBLICATIONS

Feinleib et al., "Reusable Optical Image Storage and Processing Device"; Applied Optics/vol. 11, No. 12,/Dec. 1972, pp. 2752-2759.
Owechko et al., "Theoretical Resolution Limitations of Electrooptic Spatial Light Modulators II. Effects of Crystallographic Orientation"; J. Opt. Soc. Am. A, vol. 1, #6 (1984) p. 644.
Tseng et al., "Electro-Optic 94 Memory with Write, Read and Erase Characteristics"; IBM Tech. Disclosure (09-1972) vol. 15, #4, p. 1327.
Oliver et al.; "Image Storage and Optical Readout in a ZnS Device"; Applied Physics Letters, vol. 17, #10 (15 Nov. 1970), p. 416.
"A Spatial Light Modulator Using a Bi12SiO20 Crystal and an Electrooptic Insulator", Chen et al., Optics Communications, vol. 71, No. 1,2 5/1989.
"Pockels Readout Optical Memory Using Bi12SiO20", Hou et al., Applied Physics Letters, vol. 18, No. 8, 4/1971.
"A PROM Device Using Thin Glass Plates for Insulating Layers", Jing et al., 6/1989.
E. S. Dana, W. E. Ford; *"A Textbook of Mineralogy"*; Mod. Asia Ed., 1959, John Wiley & Sons Inc., N.Y., Charles E. Tuttle Co., Tokyo, p. 278.

Primary Examiner—Eugene R. LaRoche
Assistant Examiner—Evelyn A. Lester
Attorney, Agent, or Firm—Parkhurst, Wendel & Rossi

[57] ABSTRACT

A spatial light modulating element including an electrooptic and photoconductive single crystal plate, a light-transmitting insulating layer provided on at least one of opposite surfaces of the electrooptic and photoconductive single crystal plate, and a pair of electrodes provided for applying an electric field to the insulating layer and the single crystal plate. The insulating layer is formed from a uniaxial single oxide crystal which is crystallographically oriented such that the insulating layer exhibits neither birefringence, nor an electrooptic effect in a direction of the electric field. The insulating layer may be a $LiNbO_3$, $LiTaO_3$ or $TiO_2$ (rutile) single crystal plate cut normal to the (001)-axis.

8 Claims, 1 Drawing Sheet

SPATIAL LIGHT MODULATING ELEMENT USING UNIAXIAL SINGLE CRYSTAL OF OXIDE AS INSULATING LAYER

BACKGROUND OF THE INVENTION

1. Field of the Invention

The present invention relates in general to a spatial light modulator used for optical information processing, image processing or X-ray image detection. More particularly, this invention is concerned with improvements in such a spatial light modulating element which uses a single crystal plate having both electrooptic effect and photoconductivity, and which is capable of performing various functions such as, conversion of an incoherent optical image into a coherent optical image, optical information processing, image processing, optical logical operation, or conversion of an X-ray image into a visible light image.

2. Discussion of the Prior Art

Studies and researches have been made on single crystal plates, such as bismuth silicon oxide (BSO=-$Bi_{12}SiO_{20}$) and bismuth germanium oxide (BGO=$Bi_{12}GeO_{20}$), which have both electrooptic and photoconductive properties or effects, in an attempt to utilize these single crystal plates as image converting elements, so-called PROM elements (Pockel's Readout Optical Modulator elements), for optical two-dimensional image or information processing devices. A construction of the PROM element is illustrated in FIG. 1, wherein two insulating layers 4, 4 formed of polyparaxylene, for example, are provided on opposite surfaces of a BSO single crystal wafer 2, and two light-transparent electrodes 6, 6 formed of indium oxide, for example, are provided on the respective insulating layers 4, 4.

Usually, the recording of information or images in such a PROM element is effected in the following manner. Initially, a voltage of an external power source 8 is applied between the electrodes 6, 6 on the opposite surfaces of the BSO crystal wafer 2, to produce an uniform electric field within the crystal, in a direction normal to a crystallographic plane. In this state, the crystal wafer 2 is exposed to a blue radiation (having a wavelength of about 450 nm), to form an image in the crystallographic plane. Since the BSO crystal 2 exhibits high photoconductivity upon exposure to the blue wavelength range of light, carriers are induced within the crystal, depending upon the amounts of local exposure of the crystal to the blue radiation. The carriers move through the crystal 2 and reach the insulating layers 4, by means of the electric field produced by the applied voltage. As a result, a distribution of the photo-induced charges corresponding to a specific distribution of the local exposure amounts is formed. The electric field strength in the crystal 2 is reduced due to the electric field formed by the charges, whereby a distribution of the electric field strength corresponding to the light exposure distribution is formed. Thus, information or an optical image represented by the blue radiation is recorded in the BSO crystal 2.

The reproduction or readout of the image thus recorded in the BSO crystal wafer 2 is effected by utilizing an electrooptic effect of the BSO crystal. More specifically, the BSO crystal 2 has birefringence or double refraction of an incident light due to the electrooptic effect, the degree of the birefringence being proportional to the intensity of the electric field formed within the crystal. It is noted that the two principal birefringent axes of the BSO crystal 2 are perpendicular to the direction of the electric field. In FIG. 2, there is indicated at 12 the PROM element which includes the BSO crystal 2 whose principal birefringent axes are indicated by respective two arrows. In reading out the information from the BSO crystal 2, a linearly polarized red radiation (having a wavelength of about 650 nm) is incident upon the PROM element 12 through polarizer 10, such that the plane of polarization of the red radiation forms 45° with respect to the two principal birefringent axes of the BSO crystal 2. As a result, the incident linearly polarized red radiation is converted into an elliptically polarized radiation, according to the distribution of the local electric field strength in the BSO crystal 2. Since the level of the photoconductivity of the BSO crystal 2 when exposed to the red radiation is low, the image recorded in the crystal is not destroyed or influenced by the readout red radiation. As also indicated in FIG. 2, an analyzer 14 is disposed on the output side of the PROM element 12, such that the analyzer 14 and the polarizer 10 constitute a crossed arrangement. The analyzer 14 emits an optical output whose intensity corresponds to the ellipticity of the incident elliptically polarized radiation, whereby the image recorded in the PROM element 12 is read out by the red radiation.

The erasure of the image recorded in the BSO crystal 2 of the PROM element 12 is effected by irradiating the BSO crystal with a strong blue radiation, with a uniform intensity.

The light-transmitting type PROM element constructed as shown in FIG. 1 may be replaced by a PROM element of a light-reflecting type as shown in FIG. 3, wherein a reflecting electrode 16, formed of a metallic or other material capable of reflecting light, is provided on one of opposite surfaces of the BSO crystal 2, so that an incident readout radiation is reflected by the light-reflecting electrode 16. On the other of the opposite surfaces of the crystal 2, there is provided the insulating layer 4 on which is provided the light-transparent electrode 6.

The PROM element constructed as shown in FIGS. 1 and 3 exhibits photoconductivity with respect to X rays, too. Namely, the X rays may be used for writing or recording an input image in the BSO crystal of the PROM element, and the input X-ray image may be converted into a visible light image. It is also noted that the PROM element may use a BGO crystal, in place of the BSO crystal, for achieving the same function as indicated above.

The insulating layer or layers 4 is/are essential to the PROM element, as described above. The material for the insulating layer 4 must be selected so as to satisfy the following requirements. That is, the insulating material must be easily processed, permitting stable fabrication of the insulating layer with a uniform thickness. Further, the material is required to provide for a sufficiently small thickness and a sufficiently high dielectric constant of the insulating layer.

In the case where the PROM element 12 having the two insulating layers 4 on the appropriate opposite surfaces of the BSO crystal 2, the ratio of a voltage $V_{bso}$ applied to the BSO crystal 2 to the entire voltage $V_0$ applied to the PROM element 12 is represented by the following equation:

$$V_0 V_{bso} = 1 + (2\epsilon_{bso} \cdot d_g / d_{bso} \cdot \epsilon_g)$$

where,
$\epsilon_{bs0}$ = dielectric constant of the BSO crystal
$d_{bs0}$ = thickness of the BSO crystal
$\epsilon_g$ = dielectric constant of the insulating layer
$d_g$ = thickness of the insulating layer For efficient voltage application to the PROM element with a minimum voltage drop at the insulating layer, the element must be designed such that the ratio $V_0/V_{bs0}$ is as close to "1" as possible. It will be understood from the above equation that the ratio approaches "1" as the value $d_g$ decreases. It is therefore desirable that the thickness of the insulating layer be as small as possible for efficient voltage application. It is also known that the value $d_g$ is desirably small for improved resolution of the image to be read out.

For the same reason as explained above, the ratio $V_0/V_{bs0}$ approaches "1" as the value $\epsilon_g$ increases, and it is consequently desirable that the dielectric constant be high. It is also known that the value $\epsilon_g$ is desirably large for improvement of the image resolution.

Further, the material of the insulating layer desirably has the following properties: high resistance to the applied voltage (particularly where the thickness is small); high insulation resistance; high light transmitting property, without birefringence; and high chemical resistance, high weather proof or environmental resistance and high heat resistance, for high durability and excellent operating reliability.

Several materials for the insulating layer have been proposed, as disclosed in laid-open Publication Nos. 54-48262, 57-49916 and 63-110416 of unexamined Japanese Patent Applications, which teach the use of organic insulating materials such as polyparaxylene and polystyrene, and inorganic insulating materials such as $MgF_2$, mica, and isotropic single crystals of oxides such as $Bi_4Si_3O_{12}$ and $Bi_4Ge_3O_{12}$.

However, the use of polyparaxylene (organic insulating material) for the insulating layer results in increased difficulty in forming a transparent electrode by sputtering on the insulating layer, and increased complexity in construction of the PROM element obtained. More particularly, since polyparaxylene has a low melting point and a low heat resistance, a DC sputtering process must be practiced for forming the transparent electrode such as an indium oxide film on the insulating layer, in order to accurately control the sputtering conditions such as cooling of the BSO crystal, Ar or $O_2$ gas, magnetic field in the relevant space and sputtering power. Further, since polyxylene tends to be easily deteriorated under a humid condition, the insulating layer must be protected by a gas-tight enclosure filled with a dry nitrogen gas. The provision of such an enclosure makes the PROM element considerably complicated in structure.

The use of polystyrene, on the other hand, results in insufficient mechanical strength of the insulating layer, leading to relatively short life expectancy of the PROM element.

Where mica as an inorganic insulator is used for the insulating layer, the birefringent property of the mica per se causes a phase difference of a linearly polarized light used for reading the recorded information by means of an electrooptic effect of the BSO crystal. As a result, the contrast ratio of the readout image is undesirably low. Further, the mica insulating layers have a relatively low dielectric breakdown voltage because of strength and is easily structurally deteriorated due to pin holes. Moreover, since the thin insulating layer of mica is obtained by utilizing the basal cleavage of the mica, the mica insulator is difficult to control its thickness to a desired nominal value, whereby the PROM elements using the mica insulating layers tend to suffer from fluctuation in the operating characteristic and performance.

In the case of using $MgF_2$ for the insulating layer, the insulation resistance is as low as about $10^{10}\Omega cm$, and the mechanical strength is insufficient, with the layer easily absorbing humidity. Where $Bi_4Si_3O_{12}$ or $Bi_4Ge_3O_{12}$ crystal is used, the dielectric constant is about 16 and is not sufficiently high.

As described above, the conventionally used materials for the insulating layer suffer from several drawbacks, which include: low insulating stability of the insulating layer; difficult control of the thickness of the insulating layers; consequent complexity of the PROM elements obtained; and low contrast ratio of the readout image.

OPTIC COMMUNICATIONS, Volume 71, number 1, 2, p.29-34, May 1, 1989, J. Chen and T. Minemoto shows a PROM element which uses as an insulating layer a uniaxial single crystal of oxide which is oriented such that the crystal exhibits an electrooptic effect. Because the electrooptic effects in both an electrooptic and photoconductive BSO crystal and the insulating layer are utilized at the same time, the PROM element has a comparatively low halfwave voltage ($V\pi$). However, the PROM element obtained suffers from insufficient readout contrast of a positive image. Further, since the electrooptic effect of the insulating layer is also utilized, the readout operation is influenced by an angle of incidence of the readout light beam, and the PROM element is accordingly difficult to use.

SUMMARY OF THE INVENTION

It is therefore an object of the present invention to provide a PROM element or spatial light modulating element which has a relatively low halfwave voltage, and relatively high degrees of image resolution and image readout contrast, and which uses an insulating layer which has improved insulating stability whose thickness is easily controllable during manufacture.

The above object may be achieved according to the principle of the present invention, which provides a spatial light modulating element including an electrooptic and photoconductive single crystal plate having an electrooptic effect and photoconductivity, a light-transmitting insulating layer provided on at least one of opposite surfaces of the electrooptic and photoconductive single crystal plate, and a pair of transparent electrodes provided for applying an electric field to the insulating layer and the single crystal plate, wherein the insulating layer is formed from a uniaxial single oxide crystal which is crystallographically oriented such that the insulating layer exhibits neither birefringence, nor an electrooptic effect in a direction of the electric field.

The object may also be achieved according to another aspect of the present invention, which provides a spatial light modulating element including an electrooptic and photoconductive single crystal plate having an electrooptic effect and photoconductivity, a light-transmitting insulating layer provided on one of opposite surfaces of the electrooptic and photoconductive single crystal plate, a light-reflecting electrode provided on the other of the above-indicated opposite surfaces and reflecting a readout light beam, and a transparent electrode provided on the insulating layer and cooperating with the light-reflecting electrode to apply an electric field to the insulating layer and the single crystal plate, wherein the insulating layer is formed from a uniaxial single oxide crystal which is crystallographically oriented such that the insulating layer exhibits neither birefringence, nor an electrooptic effect in a direction of the electric field.

The present spatial light modulating element which uses as the insulating layer an uniaxial single oxide crystal crystallographically oriented as described above has a sufficiently lowered halfwave voltage, significantly improved image resolution, and effectively increased image contrast ratio, which ratio is one of the important characteristics of the spatial light modulating element. Further, the insulating layer permits the element to be simplified in construction, while assuring increased insulating stability and consequently improved operating stability, together with increased ease of control of the thickness of the insulating layer during manufacture.

The insulating layer may be a $LiNbO_3$, $LiTaO_3$ or $TiO_2$ (rutile) single crystal plate cut normal to the (001)-axis.

BRIEF DESCRIPTION OF THE DRAWINGS

The above and optional objects, features and advantages of the present invention will be better understood by reading the following detailed description of the invention, when considered in connection with the accompanying drawings, in which.

DETAILED DESCRIPTION OF THE INVENTION

Figure 1:
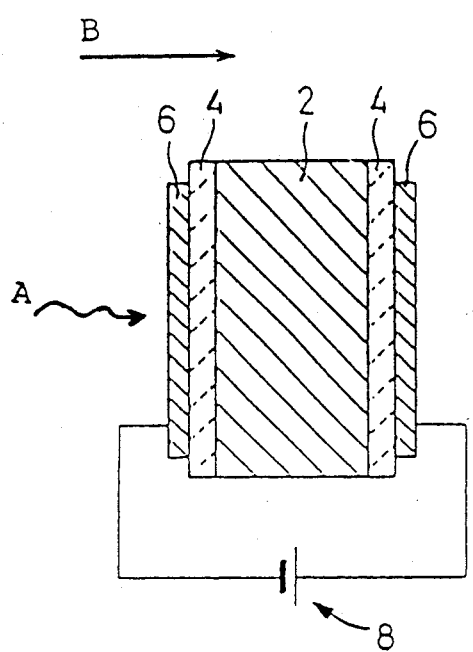
FIG. 1 is a schematic illustration of a basic construction of a light-transmitting type spatial light modulating element.
Figure 3:
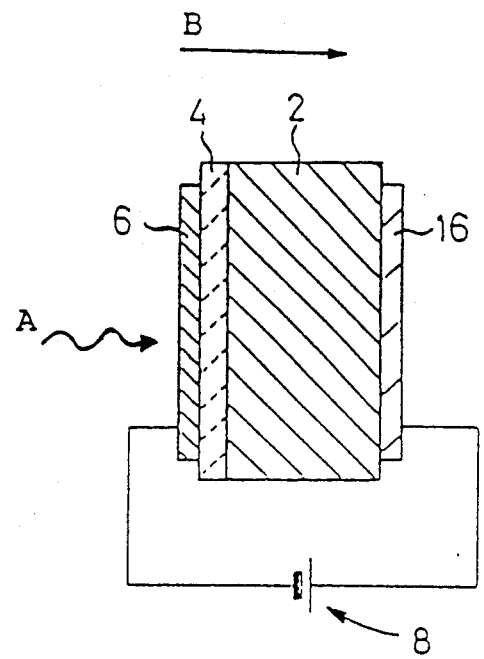
FIG. 3 is a schematic view of a light-reflecting type spatial light modulating element.
Figure 2:
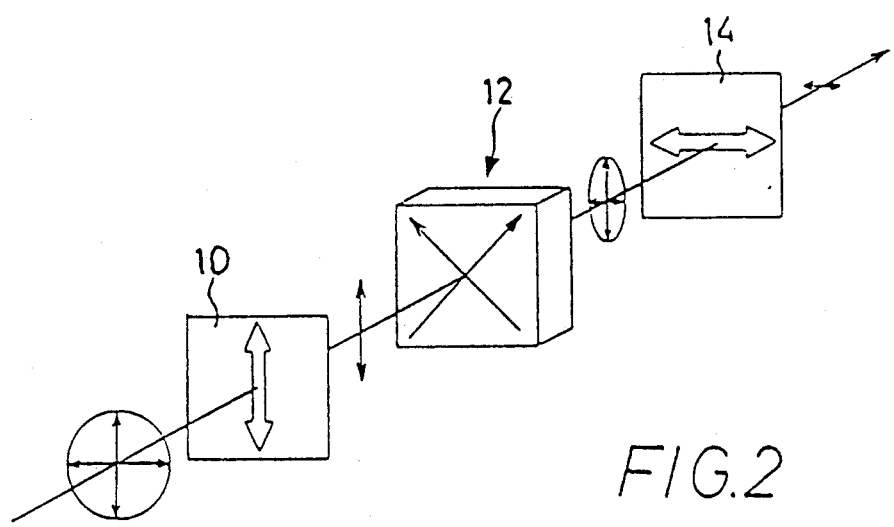
FIG. 2 is a view schematically showing a spatial light modulator system using the element of FIG. 1.

In essence, the spatial light modulating element according to the present invention which is applicable to the conventional arrangements of FIGS. 1 and 3 is characterized by the insulating layer or layers 4 each of which is formed from a uniaxial single crystal of an oxide which is crystallographically oriented such that the crystal exhibits neither birefringence or double refraction, nor electrooptic effect in a direction (right and left direction in FIGS. 1 and 3) of an electric field produced by a voltage applied to the element. In the present spatial light modulating element, the electrooptic and photoconductive single crystal plate 2 which has both an electrooptic effect and photoconductivity is formed from a known single crystal material such as bismuth silicon oxide ($Bi_{12}SiO_{20}$) or bismuth germanium oxide ($Bi_{12}GeO_{20}$). Generally, the electrooptic and photoconductive single crystal plate 2 has a thickness of about 10 μm–5 mm, and the appropriate opposite surfaces of the plate are ground by a suitable known technique. Where a coherent light beam is used as the recording or readout light beam, one of the opposite surfaces is inclined by an angle of 15'–25' with respect to the other surface.

The insulating layer 4 is provided on at least one of the opposite surfaces of the electrooptic and photoconductive single crystal plate 2. Described more particularly, this insulating layer 4 is formed from a plate obtained by slicing a uniaxial single crystal of oxide such as $LiNbO_3$, $LiTaO_3$ and $TiO_2$ (rutile), normal to the (001) axis. Since the (001)-axis cut, i.e., Z-axis cut uniaxial single crystal plate is used, the insulating layer 4 does not exhibit birefringence. The the Z-axis cut plate 4 is crystallographically oriented such that the Z axis is parallel to the direction in which a light travels through insulating layer 4, as indicated in FIGS. 1 and 3. In FIGS. 1 and 3, arrow A signifies a direction of light travel through the element and arrow B signifies the direction of the Z axis of layer 4. This orientation has a further advantage that the insulating layer 4 does not exhibit an electrooptic effect in the direction of the electric field produced during operation of the element. Thus, the uniaxial single crystal of oxide which has been conventionally considered unusable due to the birefringence can be used for the insulating layer 4, according to the principle of the present invention. The thickness of the layer 4 is suitably determined, generally within a range of about 5–100 μm.

By crystallographically orienting a uniaxial single crystal of oxide as described above, influences of the birefringence and the electrooptic effect of the uniaxial single oxide crystal as the insulating layer 4 can be eliminated. Namely, the insulating layer 4 can be obtained by utilizing the excellent properties of the uniaxial single oxide crystal, i.e., relatively high dielectric constant (for example, $\epsilon=46$ in the case of $LiTaO_3$, and $\epsilon=170$ in the case of $TiO_2$), relatively high light transparency, and ease of processing, which enable the PROM element to have a sufficiently lowered halfwave voltage ($V\pi$) and significantly improved image resolution. Further, the instant insulating layer 4 permits the PROM element to be simplified in construction, while assuring a high image contrast ratio, increased insulating stability and consequently improved operating stability, and ease of control of the thickness of the insulating layer during manufacture.

The insulating layer 4 may be fixed on a substrate glass (which will be described) or on an electrooptic and photoconductive single crystal plate 2, by bonding thereto with an adhesive a uniaxial single crystal of oxide which has been ground to a desired thickness. Alternatively, the insulating layer 4 is formed by first bonding the uniaxial single crystal of oxide to the substrate, and then grinding the uniaxial single oxide crystal to the desired thickness. The adhesive may be a silicone, acrylic or epoxy resin adhesive, or other known adhesive agents used for optical components.

On each insulating layer 4 formed on at least one of the opposite surfaces of the electrooptic and photoconductive single crystal plate 2, there is formed a transparent electrode 6 formed from a known light-transparent electrically conductive film such as an indium oxide film, a thin oxide film or an ITO film. The transparent electrode 6 maybe formed on the insulating layer 4 which has been formed on the single crystal plate 2. Alternatively, the transparent electrode 6 is first formed on a substrate glass, and then the insulating layer 4 and the single crystal plate 2 are formed on the transparent electrode 6.

Where the present invention is applied to the spatial light modulating element (PROM element) of the light-reflecting type as shown in FIG. 3, the reflecting electrode 16 formed on one of the opposite surfaces of the electrooptic and photoconductive single crystal plate 2 also serves as a member for reflecting a readout light beam. This reflecting electrode is formed of a relatively highly electrically conductive metal such as gold, silver, platinum and aluminum, by vapor deposition, sputtering or other suitable known methods.

The PROM elements constructed as described above according to the present invention are coated at their exposed surfaces with a transparent anti-reflection film or films, for example, two or more superposed layers of $SiO_2$ and $TiO_2$.

While the present invention has been described in detail, it is to be understood that the invention is not limited to the details of the foregoing description and a presently preferred embodiment which will be described below, and that the invention may be embodied with various changes, modifications and improvements, which may occur to those skilled in the art, without departing from the spirit of the invention defined in the appended claims.

PREFERRED EMBODIMENTS OF THE INVENTION

To further clarify the principle of the present invention, one typical form of the invention which is presently preferred will be described for illustrative purposes only. It is to be understood that the invention is by no means confined to this preferred embodiment.

A $Bi_{12}SiO_{20}$ crystal wafer having 15 mm×15 mm×300 μm (thickness) dimensions was prepared from a single crystal by slicing it normal to the (001) axis, such that one of opposite surfaces of the wafer was inclined by 15' with respect to the other of the opposite surfaces. In the meantime, two (001)-axis $LiTaO_3$ single crystal plates each having a thickness of 32 μm were prepared as insulating layers and were bonded to the above-indicated opposite surfaces of the $Bi_{12}SiO_{20}$ wafer by an epoxy resin adhesive. Then, a substrate glass plate whose opposite major surfaces are covered by tin oxide films as transparent electrodes was similarly bonded to each of the insulating layers on the wafer. The exposed surfaces of the substrate glass plates were coated with an anti-reflection dielectric material in the form of superposed films.

A voltage was applied between the transparent electrodes of the thus fabricated spatial light modulating element. In this condition, the element was exposed to a He-Ne laser beam. To determine the halfwave voltage ($V\pi$), the intensity of the beam transmitted through the element was measured by a photomultiplier with respect to the applied voltage. The determined halfwave voltage ($V\pi$) was 8 KV, which was significantly lower than that obtained on the conventional spatial light modulating element.

The same spatial light modulating element was exposed to a CRT blue light beam representative of a resolution test image, to record the test image. The element was then exposed to a He-Ne laser readout beam. The readout image was received by a CCD (charge-coupled device) camera, and the contrast ratio of the image taken by the camera was measured by an image analyzing system. The measurement of the contrast ratio showed an increase by about 25% as compared with that of the conventional PROM element.

What is claimed is:

1. A spatial light modulating element including an electrooptic and photoconductive single crystal plate having an electrooptic effect and photoconductivity, a light-transmitting insulating layer provided on at least one of opposite surfaces of said electrooptic and photoconductive single crystal plate, and a pair of transparent electrodes provided for applying an electric field to said insulating layer and said single crystal plate, wherein the improvement comprises:

said insulating layer being formed from a Z-axis cut uniaxial single oxide crystal which is crystallographically oriented such that a Z-axis of said uniaxial single oxide crystal is parallel to a direction which light travels through said crystal, whereby said insulating layer exhibits neither birefrigence, nor an electrooptic effect in a direction of said electric field.

2. A spatial light modulating element according to claim 1, wherein said insulating layer consists of a $LiNbO_3$ single crystal plate cut normal to the (001)-axis.

3. A spatial light modulating element according to claim 1, wherein said insulating layer consists of a $LiTaO_3$ single crystal plate cut normal to the (001)-axis.

4. A spatial light modulating element according to claim 1, wherein said insulating layer consists of a $TiO_2$ (rutile) single crystal plate cut normal to the (001)-axis.

5. A spatial light modulating element including an electrooptic and photoconductive single crystal plate having an electrooptic effect and photoconductivity, a light-transmitting insulating layer provided on one of opposite surfaces of said electrooptic and photoconductive single crystal plate, a reflecting electrode provided on the other of said opposite surfaces and reflecting a readout light, and a transparent electrode provided on said insulating layer and cooperating with said reflecting electrode to apply an electric field to said insulating layer and said single crystal plate, wherein the improvement comprises:

said insulating layer being formed from a Z-axis cut uniaxial single oxide crystal which is crystallographically oriented such that a Z axis of said uniaxial single oxide crystal is parallel to a direction which light travels through said crystal, whereby said insulating layer exhibits neither birefringence, nor an electrooptic effect in a direction of said electric field.

6. A spatial light modulating element according to claim 5, wherein said insulating layer consists of a $LiNbO_3$ single crystal plate cut normal to the (001)-axis.

7. A spatial light modulating element according to claim 5, wherein said insulating layer consists of a $LiTaO_3$ single crystal plate cut normal to the (001)-axis.

8. A spatial light modulating element according to claim 5, wherein said insulating layer consists of a $TiO_2$ (rutile) single crystal plate cut normal to the (001)-axis.

* * * * *